(12) United States Patent
Morita et al.

(10) Patent No.: US 8,935,236 B2
(45) Date of Patent: Jan. 13, 2015

(54) INFORMATION PROCESSING APPARATUS AND METHOD, AND COMPUTER PROGRAM

(75) Inventors: Toshihiro Morita, Kanagawa (JP); Yoshiyuki Takaku, Tokyo (JP); Norifumi Kikkawa, Tokyo (JP); Yoshiki Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/543,326

(22) PCT Filed: Dec. 16, 2003

(86) PCT No.: PCT/JP03/16083
§ 371 (c)(1),
(2), (4) Date: Jul. 25, 2005

(87) PCT Pub. No.: WO2004/068353
PCT Pub. Date: Aug. 12, 2004

(65) Prior Publication Data
US 2008/0027953 A1    Jan. 31, 2008

(30) Foreign Application Priority Data
Jan. 28, 2003 (JP) .................. P2003-019050

(51) Int. Cl.
*G06F 17/30* (2006.01)
*H04L 29/08* (2006.01)
(Continued)

(52) U.S. Cl.
CPC .......... *H04L 67/10* (2013.01); *G06F 17/30569* (2013.01); *G06F 17/30017* (2013.01);
(Continued)

(58) Field of Classification Search
CPC ............... G06F 17/30554; G06F 17/30569; G06F 17/3005; G06F 17/30522; G06F 17/30017; G06F 17/30292; G06F 17/30769
See application file for complete search history.

(56) References Cited

U.S. PATENT DOCUMENTS 5,050,230 A * 9/1991 Jones et al. .................. 382/166
6,463,445 B1 * 10/2002 Suzuki et al. ................ 707/200
(Continued)

FOREIGN PATENT DOCUMENTS

EP    0872990 A1    10/1998
EP    1 102 178 A2    5/2001
(Continued)

OTHER PUBLICATIONS

Ken Saito, Mikio Hashimoto, Keiichi Teramoto, Nobuyuki Monma, Toshio Okamoto, 'Digital Kaden no Setsuzoku o Koryo shita Home Gate Way Architecture', The Institute of Electronis, Information and Communication Engineers 1998 Nen Tsushin Society Taikai Koen Ronbunshu 2, The Institute of Electronics, Information and Communication Engineers, Oct. 2, 1998, p. 266.
(Continued)

*Primary Examiner* — Dung K Chau
(74) *Attorney, Agent, or Firm* — Finnegan, Henderson, Farabow, Garrett & Dunner, L.L.P.

(57) ABSTRACT

An apparatus and method allowing for high-quality data acquisition and playback processing based on content information transmitted from a server to a client are provided. Property information constituting meta-information corresponding to content-associated attribute information stores data-scheme information on original content held by the server, such as file format information, codec information representing an encoded-data scheme, and resolution information. In response to a content information acquisition request from the client, content information including the data-scheme information on the original content is generated and is transmitted to the client. This structure allows the client to output a content transmission request in which the optimum data scheme is determined based on the data scheme of the original content. Therefore, high-quality data acquisition and playback can be achieved.

5 Claims, 14 Drawing Sheets

(51) Int. Cl.
  *G11B 27/11* (2006.01)
  *H04L 12/28* (2006.01)
  *H04N 21/436* (2011.01)
  *H04N 21/4363* (2011.01)
  *H04N 21/4402* (2011.01)
  *H04N 21/462* (2011.01)

(52) U.S. Cl.
  CPC ...... *G06F17/3005* (2013.01); *G06F 17/30292* (2013.01); *G06F 17/30522* (2013.01); *G06F 17/30554* (2013.01); *G11B 27/11* (2013.01); *H04L 12/2812* (2013.01); *H04L 2012/2849* (2013.01); *H04N 21/43615* (2013.01); *H04L 67/06* (2013.01); *H04N 21/4363* (2013.01); *H04N 21/4402* (2013.01); *H04N 21/4621* (2013.01); *Y10S 707/913* (2013.01)
  USPC ........... 707/722; 707/913; 707/736; 707/756; 709/203; 709/223; 709/226; 709/231

(56) References Cited

U.S. PATENT DOCUMENTS

| | | | |
|---|---|---|---|
| 6,484,199 B2* | 11/2002 | Eyal | 709/223 |
| 6,735,628 B2* | 5/2004 | Eyal | 709/223 |
| 6,981,045 B1* | 12/2005 | Brooks | 709/226 |
| 7,031,965 B1* | 4/2006 | Moriya et al. | 386/243 |
| 7,181,444 B2 | 2/2007 | Porter et al. | |
| 7,376,155 B2 | 5/2008 | Ahn et al. | |
| 2001/0009419 A1* | 7/2001 | Ikeno et al. | 345/555 |
| 2001/0039615 A1 | 11/2001 | Bowker et al. | |
| 2001/0047400 A1* | 11/2001 | Coates et al. | 709/219 |
| 2002/0107850 A1* | 8/2002 | Sugimoto et al. | 707/3 |
| 2002/0112249 A1* | 8/2002 | Hendricks et al. | 725/136 |
| 2002/0116716 A1* | 8/2002 | Sideman | 725/91 |
| 2002/0120608 A1* | 8/2002 | Heo | 707/1 |
| 2002/0150243 A1* | 10/2002 | Craft et al. | 380/201 |
| 2002/0161835 A1* | 10/2002 | Ball et al. | 709/203 |
| 2002/0178276 A1* | 11/2002 | McCartney et al. | 709/231 |
| 2002/0178450 A1* | 11/2002 | Morita et al. | 725/61 |
| 2003/0007663 A1* | 1/2003 | Wixson et al. | 382/100 |
| 2003/0018607 A1 | 1/2003 | Lennon et al. | |
| 2003/0050894 A1* | 3/2003 | Kambayashi et al. | 705/57 |

FOREIGN PATENT DOCUMENTS

| | | |
|---|---|---|
| EP | 1213720 A1 | 6/2002 |
| EP | 1267275 A1 | 12/2002 |
| JP | 10-303986 | 11/1998 |
| JP | 2001-134518 | 5/2001 |
| JP | 2001-147877 | 5/2001 |
| JP | 2001-357008 | 12/2001 |
| JP | 2002-077855 | 3/2002 |
| JP | 2002-217894 | 8/2002 |
| JP | 2002-251350 | 9/2002 |
| JP | 2002-351759 | 12/2002 |
| WO | WO 02/42864 A2 | 5/2002 |
| WO | WO 02/42864 A3 | 5/2002 |
| WO | WO 02/061596 A1 | 8/2002 |
| WO | WO 02/084638 A1 | 10/2002 |
| WO | WO 02/086799 A2 | 10/2002 |

OTHER PUBLICATIONS

Hunter, Jane "Proposal for the Integration of DublinCore and MPEG-7." *ISO/IEC JTC1/SC29/WG11*, Oct. 2000.

European Search Report issued in a Counterpart Application Dated Jul. 23, 2008.

Hunter, Jane (DSTC Pty Ltd), "Proposal for the Integration of DublinCore and MPEG-7," International Organisation for Standardisation, Organisation Internationale De Normalisation, ISO/IEC JTC1/SC/WG11, Coding of Moving Pictures and Audio, MPEG00/M6500 (Oct. 2000, LaBaule), pp. 1-10.

European Patent Office Communication issued in Counterpart Application No. 10 175 093.3-1527 on Oct. 18, 2011 (5 pages).

Hunter, Jane, "Proposal for the Integration of Dublin Core and MPEG-7" ITU Study Group 16—Video Coding Experts Group—ISO/IEC MPEG & ITU-T VCEG(ISO/IEC JTC/SC29/WG11 and ITU-T SG16 Q6), No. M6500, Oct. 17, 2000 (XP030035650)—10 pages.

Form of Consultation (Form 2036) for EP patent application No. 10 175 093.3 dated Aug. 19, 2013.

Extended European Search Report for EP Application No. 14165859. 1, dated Jul. 3, 2014.

Mohan, Rakesh et al., "Adapting Multimedia Internet Content for Universal Access", IEEE Transactioas on Multimedia, vol. 1, No. 1, Mar. 1999, pp. 104-114.

* cited by examiner

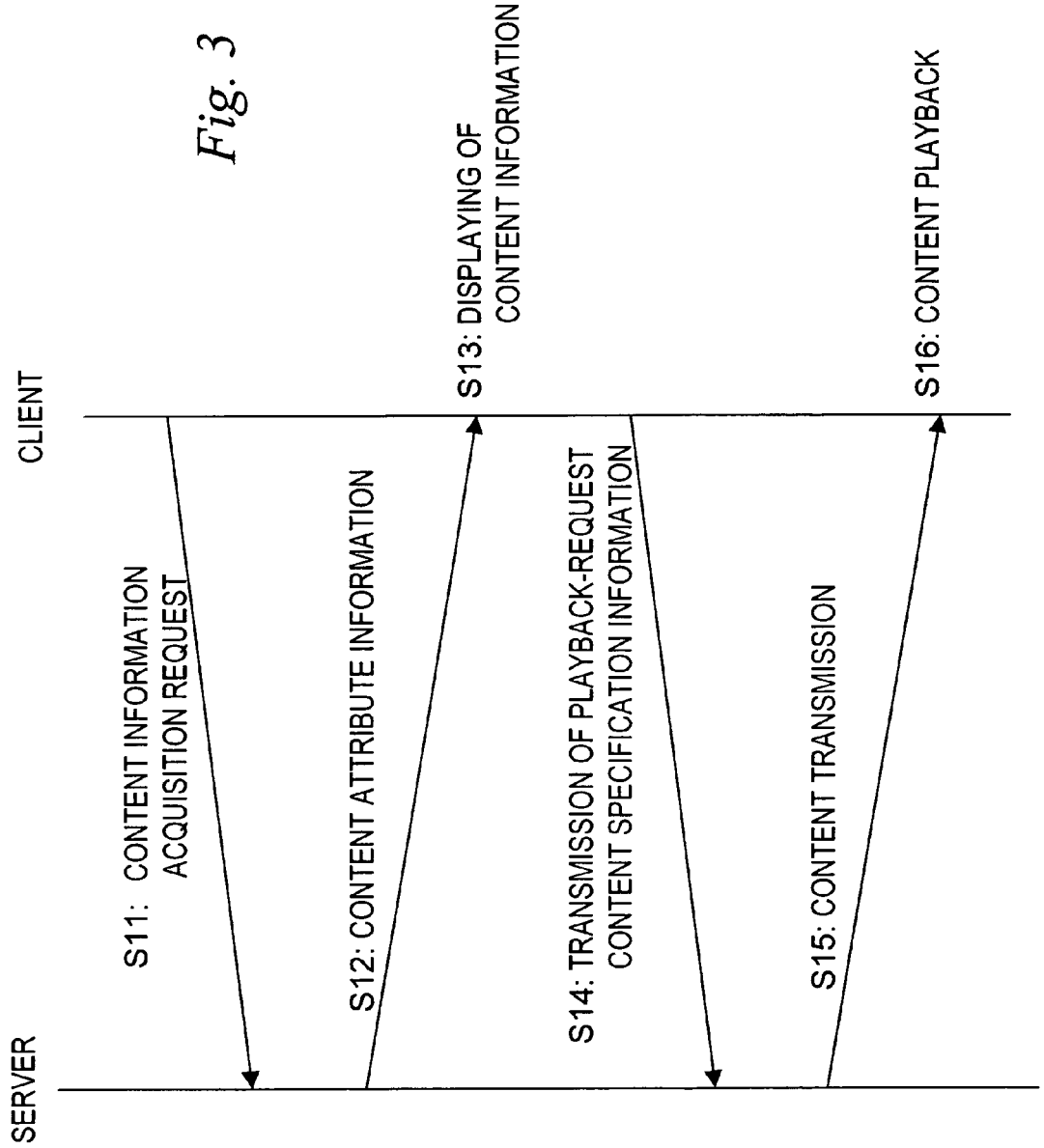

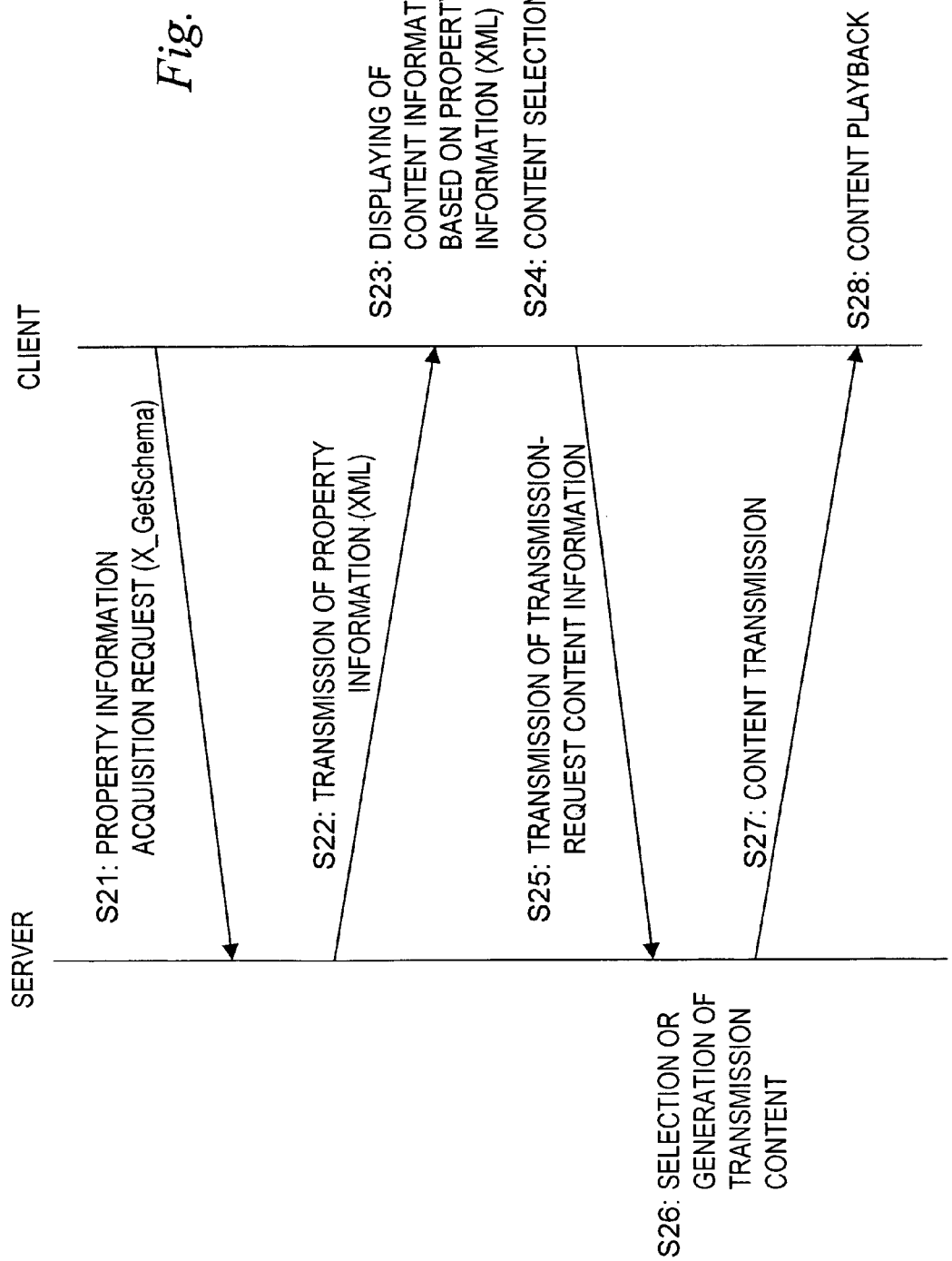

| Class Name | Description |
|---|---|
| avmusicTrack | Song. |
| avMusicAlbum | Album, having avMusicTrack as a child. |
| avMusicGenre | Genres in "Genre List," having avMusicArtist, avMusicAlbum or avMusicTrack as a child. |
| avMusicArtist | Artists in "Artist List," having avMusicAlbum or avMusicTrack as a child. |
| avMusicPlaylist | Playlist in the "Playlist List" container, having avMusicTrack constituting the playlist as a child. |
| avMusicSearchav MusicSearch | Playlist the server automatically generates in the "Various Searches" container, having avMusicTrack constituting the playlist as a child. |
| avMusicPlaylistFolder | Playlist container, having avMusicPlaylistFolder or avMusicPlaylist as a child.<br>The playlistContainer is not inherited in order to avoid conflict with avMusicPlaylist in character string matching. |
| avMusicAlbumCabinet | Album cabinet, having avMusicAlbum as a child. |
| avAllavAllMusicTracks | "All Songs" container, whose child is avMusicTrack. |
| avAllavAllMusicAlbums | "Album List" container, whose child is avMusicAlbum. |
| avAllavAllMusicArtists | "Artist List" container, whose child is avMusicArtist. |
| avAllavAllMusicGenre | "Genre List" container, whose child is avMusicGenre. |
| avAllavAllMusicPlaylists | "Playlist List" container, whose child is avMusicPlaylist or avMusicPlaylistFolder. |
| avAllMusicSearch | "Various Searches" container, whose child is avMusicSearchavMusicSearch. |
| avAllMusicAlbum Cabinets | "Album Cabinet List" container, whose child is avMusicAlbumCabinet. |

*Fig.5*

| Property Name | Type | Multiple | Property Description |
|---|---|---|---|
| av:totalSize | unsigned long | no | The size (the original size) of a resource included in the container. An approximate value is applicable. In bytes. |
| av:totalDuration | duration | no | The total duration of a resource included in the container. An approximate value is applicable. |
| av:recordQualityLevel | integer | no | The quality level of the content: {1, 2, 3, 4, 5, 6, 7} For moving pictures, approximate target values are: Level 3: 2 Mbps Level 4: 4 Mbps Level 5: 8 Mbps. The values are not strictly defined. If multiple resources have different quality levels, the highest level is set. (In each resource, res@av:recordQualityLevel is set.) |
| av:originalFileFormat | string | no | The MIME-type of the original data (unconverted). If unknown, application/octet-stream is set. |
| av:originalCodec | string | no | The codec of the original data (unconverted). If unknown, no tag is set. The same AllowedValueList definition as res@av:codec |
| av:originalResolution | resolution | no | The resolution of the original data (image) (unconverted). |

| Property Name | Type | Multiple | Property Description |
|---|---|---|---|
| res@protocolInfo | string | no | [Conversion attribute]<br>Information about the file format (MIME-Type) is also included in this property.<br>This property is also used for data conversion. |
| res@av:codec | string | no | [Conversion attribute]<br>Codec. |
| res@size | unsigned long | no | [Conversion attribute]<br>Size in bytes of the resource |
| res@resolution | resolution | no | [Conversion attribute]<br>XxY resolution of the resource in pixels (typically image item or video item).<br>This property is also used for image conversion.<br>The max resolution during conversion is determined from AllowedValueRange given by X_GetSchema. |

*Fig. 7*

| Allowed Value | Description |
|---|---|
| MPEG1L3 | MPEG1 layer 3 |
| ATRAC3 | ATRAC3 |
| ATRAC3plus | ATRAC-X |
| PCM | WAV, LPCM |
| JPEG | JPEG |
| CLUT8 | GIF |
| RGB16 | TIFF, BMP |
| RGB24 | TIFF, BMP, PNG |
| JPEG | TIFF |
| YUV420 | YUV |
| MPEG1V | MPEG1 PS |
| MPEG2V | MPEG2 PS |
| MPEG4V | MPEG4 |

*Fig. 8*

INFORMATION PROCESSING APPARATUS AND METHOD, AND COMPUTER PROGRAM

TECHNICAL FIELD

The present invention relates to an information processing apparatus and method and to a computer program. More specifically, the present invention relates to an information processing apparatus and method and to a computer program providing a configuration for transmission and reception of content in various data schemes such as MPEG and ATRAC between network-connected devices, in which a client is notified of data-scheme information on original content held by a content providing server, thus allowing for optimum content selection in the client.

BACKGROUND ART

With the recent prevalence of data communication networks, even at home, so-called home network systems, in which home electric devices, computers, and other peripheral devices are connected to a network so that these devices can communicate with one another, have become increasingly popular. Home network systems allow network-connected devices to communicate with one another to share the data processing functions of the devices and to transmit and receive content between the devices, thus providing usability and convenience for the users. In the future, home network systems will become increasingly widespread.

One known protocol suitable for such home network configuration is Universal Plug and Play (UPnP). Universal Plug and Play (UPnP) allows for easy establishment of networks without the accompanying complex operation, and allows network-connected devices to receive services provided by connected devices without the accompanying difficult operation or setting-up. UPnP also has the advantage of the easy addition of devices without relying on an OS (operating system) on the devices.

In UPnP, XML (eXtensible Markup Language) definition files are exchanged between the connected devices for mutual authentication between the devices. The UPnP processing schematically includes:

(1) addressing, in which a device ID, e.g., IP address, is obtained:

(2) discovery, in which devices on the network are searched for, responses are received from the devices, and information included in the responses, e.g., the device types, the functions, etc., is acquired: and (3) service request, in which a service request is submitted to each of the devices based on the information acquired in the discovery processing.

The processing procedure described above allows for provision and reception of services using the network-connected devices. A new device to be connected to the network can obtain its device ID in the addressing processing, and can acquire information about the other network-connected devices in the discovery processing. Then, the new device can submit a service request to the other devices based on the acquired information.

For example, when content stored in a server, such as music data and image data, is to be played back on a client device, an acquisition request for various content attribute information stored in the server, including content information, e.g., the song title, the movie title, the artist name, etc., data-compression-scheme information (ATRAC (adaptive transform acoustic coding), MPEG (moving picture experts group), etc.), and, if necessary, copyright information, is sent from the client to the server. The attribute information is called metadata or meta-information.

In response to the request from the client, the server transmits metadata (attribute information) about the content held by the server to the client. The client displays the content information on a display of the client device based on the metadata obtained from the server according to a predetermined display program. For example, a song list including artist names and titles is displayed on the display. The user checks or selects content to be played back based on the displayed information, and sends a transmission request of the content to the server. The server receives the content request from the client, and the content is transmitted from the server to the client in response to the received request. In the client, the received content is played back.

As such, content stored in a server in a home network can be accessed from other network-connected devices. For example, a device performing the UPnP connection described above, which is a simple device connection protocol, can acquire content. When the content is movie data or music data, the user can view the movie or listen to the music by connecting a TV, a player, or the like as a network-connected device.

Various types of content, such as music and image data, are generally transmitted and received as data encoded in various schemes between devices, and are stored in a storage unit of each of the devices. For example, audio data schemes include ATRAC3 (adaptive transform acoustic coding3) and ATRAC3plus, and video data schemes include MPEG1 (moving picture experts group1), MPEG2, and MPEG4.

For example, in the home network configuration, a server providing content to clients stores content received via a tuner or original content input from a storage medium, such as a CD or a DVD, in its storage device, if necessary, and performs a content providing process via the network in response to a request from a client. In the content providing process, it is necessary to provide encoded data that is supported by the data processing, or the data decoding function, of the client device. Therefore, the server performs data conversion on the original content using a codec, or a data conversion unit, of the server, and provides the converted data to the clients.

When a client specifies a data scheme supported by the client device or the desired data scheme and submits a data request to the server, the server transmits the encoded video or audio data having the data scheme in accordance with the request from the client to the client. The client performs the codec function of the client device, or data conversion, on the received data to play back the content.

A data conversion processing mechanism of the related art for transmission and reception of encoded data between a server and a client is disclosed in, for example, Patent Document 1 (Japanese Unexamined Patent Application Publication No. 2002-77855). Patent Document 1 shows a data access server configuration allowing automatic selection of efficient transcoding, i.e., data conversion, according to content encoding format information held by a content server and client-decodable data format information to perform data conversion.

In view of data quality, however, desirably, the client receives the original data held by the server and plays back the original data. In the message interchange protocol, complying with the current UPnP specification, in a content request between the server and the client, although it is possible to submit a data scheme specification request from the client, the client is not notified of the original data scheme held by the server, and therefore, is not allowed to know of the data scheme of the original content.

Thus, the client is not allowed to determine whether the data received from the server is original data or data converted, e.g., re-encoded, by the server, and is not allowed to perform a process for selectively receiving the highest quality data receivable by the client and playing back the data.

DISCLOSURE OF INVENTION

In view of the foregoing problems with the related art, it is an object of the present invention to provide an information processing apparatus and method and a computer program that allow a client to obtain data-scheme information on original content held by a server storing content and that allow the client to specify the content to be received from the server and played back as the original content, thus allowing for high-quality data playback in the client.

According to a first aspect of the present invention, there is provided an information processing apparatus serving as a content providing server performing a content transmission process in response to a request from a client, including:

a storage unit storing content and metadata corresponding to content attribute information;

a data transmission and reception unit performing a data transmission and reception process; and a control unit extracting the metadata from the storage unit upon reception of a content information acquisition request from the client, and generating content information to be transmitted to the client based on property information that is an element of the metadata, wherein the storage unit stores data-scheme information on original content held by the server as the property information that is an element of the metadata associated with the content, and the control unit generates content information including the data-scheme information on the original content held by the server upon reception of the content information acquisition request from the client, and transmits the content information via the data transmission and reception unit.

In an embodiment of the information processing apparatus according to the present invention, the storage unit stores, as the property information that is an element of the metadata associated with the content, data-scheme information including information indicating whether the content is the original content held by the server or content converted into a different scheme from the original content, and the control unit generates content information including data-scheme information on the original content held by the server or the content converted into a different scheme from the original content upon reception of the content information acquisition request from the client, and transmits the content information via the data transmission and reception unit.

In an embodiment of the information processing apparatus according to the present invention, the storage unit stores, as the property information associated with the content, at least one of file format information, codec information representing an encoded-data scheme, and resolution information as the data-scheme information on the original content held by the server, and the control unit generates content information including the at least one of the file format information, the codec information representing the encoded-data scheme, and the resolution information, and transmits the content information via the data transmission and reception unit.

In another embodiment of the information processing apparatus according to the present invention, the storage unit further stores data-scheme information on content available from the server to the client as the property information associated with the content, and the control unit generates content information including the data-scheme information on the content available from the server to the client, and transmits the content information via the data transmission and reception unit.

In another embodiment of the information processing apparatus according to the present invention, the data-scheme information on the content available to the client is information including at least one of file format information, codec information representing an encoded-data scheme, and resolution information.

In another embodiment of the information processing apparatus according to the present invention, the control unit performs a process for generating, as transmission data to the client, XML (eXtensible Markup Language) data having the content information including the data-scheme information on the original content held by the server.

According to a second aspect of the present invention, there is provided an information processing apparatus serving as a client submitting a content transmission request to a content providing server, including:

a data transmission and reception unit performing a data transmission and reception process to and from the content providing server;

a control unit generating display information to be displayed on an output unit based on content information received from the server via the data transmission and reception unit; and a display unit outputting and displaying the display information generated by the control unit, wherein the control unit performs a process for generating display information configured to allow identification of data-scheme information on original content held by the server, the data-scheme information being contained in property information that is an element of the content information received from the server.

In an embodiment of the information processing apparatus according to the present invention, the data-scheme information on the original content includes at least one of file format information, codec information representing an encoded-data scheme, and resolution information on the original content held by the server, and the control unit performs a process for generating display information allowing identification of original content data information concerning the at least one of the file format information, the codec information, and the resolution.

In another embodiment of the information processing apparatus according to the present invention, the control unit performs a process for generating display information so that the generated display information includes data-scheme information on content available from the server to the client, the data-scheme information being contained in the property information received from the server, the display information allowing identification of whether or not each of the data-scheme information is supported by the client based on client-device processing function information.

In another embodiment of the information processing apparatus according to the present invention, the data-scheme information on the content available to the client includes at least one of file format information, codec information representing an encoded-data scheme, and resolution information, and the control unit performs a process for generating display information allowing identification of whether or not the at least one of the file format information, the codec information, and the resolution is supported by the client.

In another embodiment of the information processing apparatus according to the present invention, the control unit performs a process for generating the display information by analyzing XML (eXtensible Markup Language) data having the content information received from the server.

According to a third aspect of the present invention, there is provided an information processing apparatus serving as a client submitting a content transmission request to a content providing server, including:

a data transmission and reception unit performing a data transmission and reception process to and from the content providing server; and a control unit performing a process for determining a transmission data scheme from the server based on data-scheme information on original content held by the server, the data-scheme information being contained in property information that is an element of content information received from the server via the data transmission and reception unit, data-scheme information on content available from the server to the client, and client-device processing function information, and for outputting a content transmission request along with the determined information to the server via the data transmission and reception unit.

In an embodiment of the information processing apparatus according to the present invention, the property information received from the server includes data-scheme information including information indicating whether content associated with the property information is original content or content converted into a different scheme from the original content, and the control unit performs a process for determining a transmission data scheme from the server based on the data-scheme information and the client-device processing function information, and for outputting a content transmission request along with the determined information to the server via the data transmission and reception unit.

In an embodiment of the information processing apparatus according to the present invention, the control unit performs a process for determining a data scheme of the original content as the transmission data scheme from the server when the data-scheme information on the original content held by the server represents a client-device-supported data scheme, and for determining a data scheme that is a client-device-supported data scheme and that is close to the data scheme of the original content as the transmission data scheme from the server according to predetermined setting information when the data-scheme information on the original content held by the server does not represent a client-device-supported data scheme.

In another embodiment of the information processing apparatus according to the present invention, the data-scheme information on the original content includes at least one of file format information, codec information representing an encoded-data scheme, and resolution information on the original content held by the server, and the control unit performs a process for determining the transmission data scheme from the server with respect to the at least one of the file format information, the codec information, and the resolution.

According to a fourth aspect of the present invention, there is provided an information processing method for performing a content information transmission process, including:

a content information acquisition request receiving step of receiving a content information acquisition request from a client;

a content information generating step of extracting, as property information constituting metadata associated with content, data-scheme information on original content held by a server from a storage unit, and generating content information to be transmitted to the client based on the property information including the data-scheme information on the original content; and a content information transmitting step of transmitting the generated content information to the client via a data transmission and reception unit.

In an embodiment of the information processing method according to the present invention, the content information generating step is a step of generating content information including information indicating whether content associated with the property information is the original content held by the server or content converted into a different scheme from the original content, and the content information transmitting step is a step of transmitting content information including the information indicating whether the content associated with the property information is the original content held by the server of the content converted into a different scheme from the original content.

In an embodiment of the information processing method according to the present invention, the storage unit stores, as the property information associated with the content, at least one of file format information, codec information representing an encoded-data scheme, and resolution information as the data-scheme information on the original content held by the server, and the content information generating step generates content information including the at least one of the file format information, the codec information representing the encoded-data scheme, and the resolution information.

In another embodiment of the information processing method according to the present invention, the storage unit further stores data-scheme information on content available from the server to the client as the property information associated with the content, and the content information generating step generates content information including the data-scheme information on the content available from the server to the client.

In another embodiment of the information processing method according to the present invention, the data-scheme information on the content available to the client is information including at least one of file format information, codec information representing an encoded-data scheme, and resolution information.

In another embodiment of the information processing method according to the present invention, the content information generating step performs a process for generating, as transmission data to the client, XML (eXtensible Markup Language) data having the content information including the data-scheme information on the original content held by the server.

According to a fifth aspect of the present invention, there is provided an information processing method for performing a content information display process, including:

a step of receiving content information from a server;

a display information generating step of generating display information configured to allow identification of data-scheme information on original content held by the server, the data-scheme information being contained in property information that is an element of the content information received from the server; and a step of outputting the display information to displaying means.

In an embodiment of the information processing method according to the present invention, the data-scheme information on the original content includes at least one of file format information, codec information representing an encoded-data scheme, and resolution information on the original content held by the server, and the display information generating step performs a process for generating display information allowing identification of original content data information concerning the at least one of the file format information, the codec information, and the resolution information.

In another embodiment of the information processing method according to the present invention, the display information generating step performs a process for generating display information so that the generated display information includes data-scheme information on content available from the server to the client, the data-scheme information being contained in the property information received from the server, the display information allowing identification of whether or not each of the data-scheme information is supported by the client based on client-device processing function information.

In another embodiment of the information processing method according to the present invention, the data-scheme information on the content available to the client includes at least one of file format information, codec information representing an encoded-data scheme, and resolution information, and the display information generating step performs a process for generating display information allowing identification of whether or not the at least one of the file format information, the codec information, and the resolution is supported by the client.

In another embodiment of the information processing method according to the present invention, the display information generating step performs a process for generating the display information by analyzing XML (eXtensible Markup Language) data having the content information received from the server.

According to a sixth aspect of the present invention, there is provided an information processing method for performing a transmission content data scheme determination process based on content information, including:

a step of receiving content information from a server;

a transmission data scheme determining step of performing a process for determining a transmission data scheme from the server based on data-scheme information on original content held by the server, the data-scheme information being contained in property information that is an element of the content information received from the server, data-scheme information on content available from the server to a client, and client-device processing function information; and a content transmission request transmitting step of performing a process for outputting a content transmission request along with the information determined in the transmission data scheme determining step to the server via a data transmission and reception unit.

In an embodiment of the information processing method according to the present invention, the property information received from the server includes data-scheme information including information indicating whether content associated with the property information is the original content or content converted into a different scheme from the original content, and the transmission data scheme determining step is a step of determining the transmission data scheme from the server based on the data-scheme information and the client-device processing function information.

In an embodiment of the information processing method according to the present invention, the transmission data scheme determining step performs a process for determining a data scheme of the original content as the transmission data scheme from the server when the data-scheme information on the original content held by the server represents a client-device-supported data scheme, and for determining a data scheme that is a client-device-supported data scheme and that is close to the data scheme of the original content as the transmission data scheme from the server according to predetermined setting information when the data-scheme information on the original content held by the server does not represent a client-device-supported data scheme.

In another embodiment of the information processing method according to the present invention, the data-scheme information on the original content includes at least one of file format information, codec information representing an encoded-data scheme, and resolution information on the original content held by the server, and the transmission data scheme determining step performs a process for determining the transmission data scheme from the server with respect to the at least one of the file format information, the codec information, and the resolution.

According to a seventh aspect of the present invention, there is provided a computer program causing a content information transmission process to be performed on a computer, including:

a content information acquisition request receiving step of receiving a content information acquisition request from a client;

a content information generating step of extracting, as property information constituting metadata associated with content, data-scheme information on original content held by a server from a storage unit, and generating content information to be transmitted to the client based on the property information including the data-scheme information on the original content; and a content information transmitting step of transmitting the generated content information to the client via a data transmission and reception unit.

In an embodiment of the computer program according to the present invention, the content information generating step is a step of generating content information including information indicating whether content associated with the property information is the original content held by the server or content converted into a different scheme from the original content, and the content information transmitting step is a step of transmitting the content information including the information indicating whether the content associated with the property information is the original content held by the server or the content converted into a different scheme from the original content.

According to an eighth aspect of the present invention, there is provided a computer program causing a content information display process to be performed on a computer, including:

a step of receiving content information from a server;

a display information generating step of generating display information configured to allow identification of data-scheme information on original content held by the server, the data-scheme information being contained in property information that is an element of the content information received from the server; and a step of outputting the display information to displaying means.

According to a ninth aspect of the present invention, there is provided a computer program causing a transmission content data scheme determination process based on content information to be performed on a computer, including:

a step of receiving content information from a server;

a transmission data scheme determining step of performing a process for determining a transmission data scheme from the server based on data-scheme information on original content held by the server, the data-scheme information being contained in property information that is an element of the content information received from the server, data-scheme information on content available from the server to a client, and client-device processing function information; and a content transmission request transmitting step of performing a process for outputting a content transmission request along with the information determined in the transmission data scheme determining step to the server via a data transmission and reception unit.

In an embodiment of the computer program according to the present invention, the property information received from the server includes data-scheme information including information indicating whether content associated with the property information is the original content or content converted into a different scheme from the original content, and the transmission data scheme determining step is a step of determining the transmission data scheme from the server based on the data-scheme information and the client-device processing function information.

According to the structure of the present invention, furthermore, a client device submitting a content transmission request to a content providing server generates display information configured to allow identification of data-scheme information on original content held by the server, which is contained in property information that is an element of the content information received from the server, and displays the display information on a display of the client. The user can therefore identify the data-scheme information on the original content and data-scheme information on content available from the server to the client based on the display information, and can easily determine the optimum data scheme before outputting a content transmission request to the server.

According to the structure of the present invention, furthermore, a client device submitting a content transmission request to a content providing server determines a transmission data scheme from the server based on data-scheme information on original content held by the server, which is contained in property information that is an element of content information received from the server, data-scheme information on content available from the server to the client, and client-device processing function information, and outputs a content transmission request with the determined information to the server. Thus, acquisition and playback of the original data without excessive data conversion or high-quality data close to the original data can be achieved without placing a processing load for data selection, etc., on the user.

A computer program according to the present invention is, for example, a computer program that can be offered in a computer-readable manner to a general-purpose computer system capable of executing various types of program code through a storage medium or a communication medium, e.g., a storage medium such as a CD, an FD, or an MO disk, or a communication medium such as a network. Such a computer-readable program allows for processing in accordance with the program on the computer system.

Further objects, features, and advantages of the present invention will become apparent from the following detailed description, taken in conjunction with embodiments of the present invention and the accompanying drawings. In this document, the term system is a logical set of a plurality of apparatuses, and is not limited to the one having these apparatuses in a single house.

BRIEF DESCRIPTION OF THE DRAWINGS

FIG. 3 is a diagram showing a processing sequence performed between a server and a client in a content data playback process.

FIG. 4 is a diagram showing a processing sequence performed between the server and the client for selection of a content data scheme based on property information and for transmission and reception of content.

FIG. 5 is a diagram showing classes used as information specifying property information to be transmitted to the server.

FIG. 6 is a diagram showing property information constituting metadata configured in association with content data.

FIG. 7 is a diagram showing property information constituting metadata configured in association with content data.

FIG. 8 is a diagram showing allowed values of codec in the property information.

BEST MODE FOR CARRYING OUT THE INVENTION

An information processing apparatus and method and a computer program according to the present invention will be described hereinbelow with reference to the drawings.

[System Overview]

Figure 1:
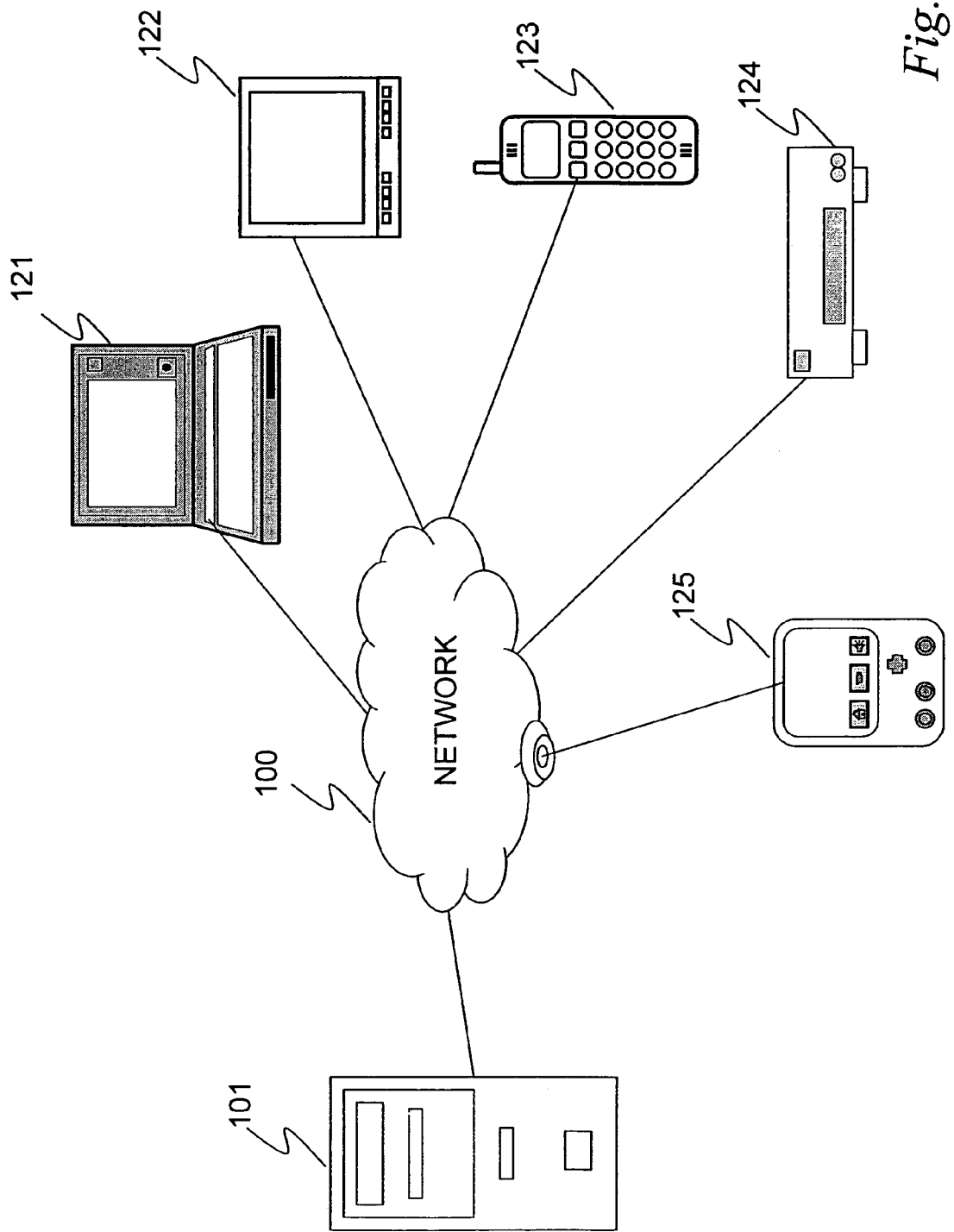
FIG. 1 is a diagram showing an example network configuration according to the present invention.

First, an example network configuration according to the present invention will be described with reference to FIG. 1. FIG. 1 shows the configuration, e.g., the home network configuration, in which a server 101 performing processing in response to a processing request from various client devices is connected with client devices submitting processing requests to the server 101, namely, a PC 121, a monitor 122, a portable telephone 123, a player 124, and a PDA 125, via a network 100. Other client devices, such as various electronic devices and electric appliances, may be connected.

The processing performed by the server 101 in response to a request from a client includes, for example, providing the content stored in storage means of the server 101, such as a hard disk, and providing a data processing service by executing a server-executable application program. Although the server 101 and the client devices are distinguishably shown in FIG. 1, a device providing a service in response to a request from a client is called a server, and any client device providing its data processing service to another client has the server function. Thus, any network-connected client device shown in FIG. 1 may be a server.

The network 100 is a wired or wireless network, and each connected device transmits and receives a communication packet, e.g., an Ethernet (registered trademark) frame, via the network 100. A certain client transmits a frame in which processing request information is stored in a data section of an Ethernet frame to the server 101 to submit a data processing request to the server 101. The server 101 performs data processing in response to the received processing request frame, and transmits a communication packet having a data section in which result data as a result of the data processing is stored, if necessary, to the clients.

Each network-connected device is, for example, a Universal Plug and Play (UPnP) device. This configuration allows for easy addition and deletion of a network-connected device. A new device to be connected to the network performs a processing procedure including:

(1) addressing, in which its device ID, e.g., IP address, is obtained:

(2) discovery, in which devices on the network are searched for, responses are received from the devices, and information included in the responses, e.g., the device types, the functions, etc., is acquired; and (3) service request, in which a service request is submitted to each of the devices based on the information acquired in the discovery processing.

This processing procedure allows for reception of services using the network-connected devices.

An example hardware configuration of a PC as an information processing apparatus constituting each of the server and the client devices shown in FIG. 1 will be described with reference to FIG. 2.

A CPU (Central Processing Unit) 201 executes various processes according to a program stored in a ROM (Read Only Memory) 202, an HDD 204, or the like, and functions as data processing means or communication control processing means. A RAM 203 stores the program executed by the CPU 201 and data, if necessary. The CPU 201, the ROM 202, the RAM 203, and the HDD 204 are connected with one another via a bus 205.

An input/output interface 206 is connected to the bus 205. An input unit 207 composed of, for example, a keyboard, a switch, a button, a mouse, or the like operated by a user, and an output unit 208 composed of an LCD, a CRT, a speaker, or the like for presenting various information to the user are connected to the input/output interface 206. A communication unit 209 serving as data transmitting and receiving means, and a removable recording medium 211, such as a magnetic disk, an optical disk, a magneto-optical disk, or a semiconductor memory, may also be attached. A drive 210 performing a data reading or writing process to and from the removable recording medium 211 is also connected.

Figure 2:
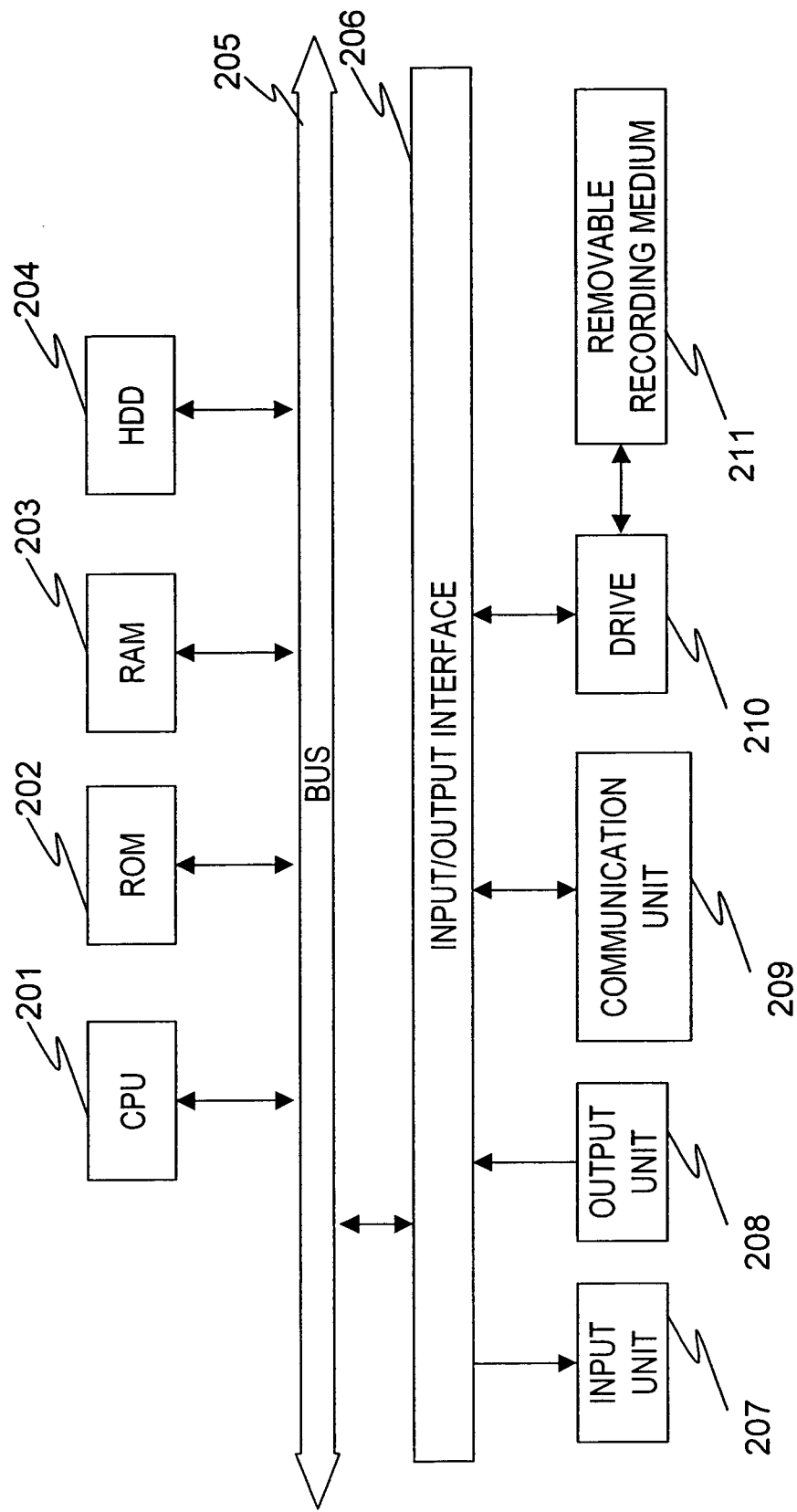
FIG. 2 is a diagram showing an example structure of a network-connected device.

Although the configuration of a server as an example of the network-connected devices shown in FIG. 1, or a personal computer (PC), is shown in FIG. 2, the network-connected devices are not limited to PCs, and may be portable communication terminals, such as portable telephones and PDAs, as shown in FIG. 1, and other various electronic devices and information processing apparatuses, such as playback devices and displays. It is therefore possible to provide hardware configuration unique to each device, and processing in accordance with the hardware is performed.

[Metadata]

Next, metadata held by a server storing content to be provided to a client will be described. The server holds, as metadata, attribute information associated with each piece of content stored in a storage unit of the server, such as video data of a still image, a moving picture, etc., and audio data of music, etc.

The content held by the server, such as video data of a still image, a moving picture, etc., and audio data of music, etc., is generally referred to as "AV content". In the server, the AV content is managed by a hierarchical content directory.

The content directory has a hierarchical structure including folders each storing a piece of AV content or a plurality of pieces of AV content. Each folder storing an element of the content directory, that is, a piece of AV content, or a plurality of pieces of AV content, is referred to as an "object". Object is the generic term for units of data processed by the server. There are various objects other than a folder storing a piece of AV content or a plurality of pieces of AV content.

The minimum unit of the AV content, that is, one piece of music data, one piece of moving picture data, one piece of still image data, etc., is referred to as an "item".

The objects are separated into classes depending upon the type, e.g., music (Audio), video (Video), or photographs (Photo), and are subjected to class labeling. For example, the client can specify a certain class, and can request and execute searching for only the object belonging to the specified class. In the server, the classes are also managed by the hierarchical structure, in which sub-classes can be configured under one class.

The metadata is management information including attribute information associated with the content held by the server, class definition information, and information concerning the hierarchical structure constituting the content directory. The metadata, which is content attribute information defined in association with each object, includes various information, such as the content identifier (ID), the data size, the resource information, the title, the artist name, and the copyright information. Each piece of information contained in the metadata is referred to as a "property". It is pre-defined what properties constituting metadata belong to each of the classes described above, such as music (Audio), video (Video), and photographs (Photo).

[Processing Based on Property Information Acquired by Client]

For example, a client that is to play back content submits a content request to the server, and receives the requested content from the server to play back the content. A general procedure for content playback will be described with reference to FIG. 3. First, in step S11, the client performs an acquisition request for content information held by the server. In step S12, in response to the request from the client, the server generates content information, such as the title and the artist name, by XML (eXtensible Markup Language) data based on content-associated metadata, and transmits the content information to the client.

In step S13, the client displays the content information on a display according to the received XML information. For example, music content is displayed as a list including song titles, artist names, total play times, etc., of a plurality of music recordings held by the server.

Then, in step S14, the client selects a song to be received from the server and played back on the client device, and transmits content specification information (e.g., content ID) to the server. The server retrieves the content from the storage means based on the received content specification information, and transmits the retrieved content. In step S16, the client plays back the content received from the server. Content compressed by ATRAC, MPEG, etc., is decoded by the client before it is played back.

A general content playback procedure is as described above. The client can acquire various content attribute information, i.e., property information included in the metadata associated with the content held by the server.

[Provision of Original Data Information]

In the structure of the present invention, content original data information is set as property information as an element of metadata associated with content stored in the server. In response to a content information request submitted to the server from the user, or the client, the server provides information about content original data, specifically, data-scheme information including the file format, codec information, and resolution information on the original data, to the client.

The original data is data acquired by the server from the outside, e.g., a broadcast, a network, or a storage medium such as a DVD or a CD, and is data that is not converted by data converting means, such as encoding and decoding means, in the server.

The client can recognize both a data scheme available from the server and a data scheme of original data held by the server based on the content information provided by the server. For example, the client displays a content list in which these kinds of information are listed on the display. Examples of the displayed data are described below.

The user selects a content data scheme (file format, codec information, resolution information, etc.) to be received from the server and played back based on the content list displayed on the display, and transmits the selected data-scheme information to the server. The server retrieves transmission data from the storage unit based on the specification by the client, and transmits content data, which is converted into client's desired data scheme by performing data conversion, if necessary, using the codec function, etc., for file format conversion and encoding and decoding, to the client.

A sequence of processes for providing content information including original data information from the server to the client, displaying the content information based on content information received from the server on the client machine, and performing data selection will be described hereinbelow with reference to FIG. 4.

First, in step S21, the client performs a request for content information held by the server. In this example, command [X_GETSchema] is transmitted to the server. The command [X_GETSchema] is a command interpretable by devices constituting the system of the present invention. Upon receiving the command, the server generates XML data based on property information constituting metadata associated with various objects, such as content, according to the request, and transmits the XML data to the client.

The client can specify which object, or which content type, to acquire with respect to property information when requesting the property information. For example, the client specifies one of the classes described above, e.g., music (Audio), video (Video), photographs (Photo), etc., and performs an acquisition request for the property information about an object included in the specified class. In this case, the command [X_GETSchema] along with the class name is transmitted to the server.

In the server, the classes are managed by the hierarchy structure, and one class can have a sub-class as a child class thereof. For example, multiple classes related to music (Music) are configured. The classes related to music (Music) are shown in, for example, FIG. 5.

As shown in FIG. 5, multiple classes, such as a song, an album, a genre, and an album cabinet containing a plurality of albums, are configured. The client can specify any of these classes, and can transmit the command [X_GETSchema] as the property information acquisition request described above to the server to acquire the content property information corresponding to the specified class.

As shown in FIG. 5, classes are separated into multiple categories. The user can specify a desired class, and can acquire property information on the specified class.

In the server, music content and image content are managed in various schemes. That is, there are different compressed data schemes, such as ATRAC3, ATRAC3plus, MPEG2, and MPEG4, depending upon the stored content. There are also different degrees of recording quality of the content, or record quality levels.

The data schemes supported by client devices differ from one device to another. Each client preferably receives and plays back the highest quality data supported by the client device.

Upon receiving a property information acquisition request from the client, for example, the server retrieves the metadata associated with the content corresponding to the specified class from the storage means, and generates XML data including property information to be transmitted to the client based on the retrieved metadata. In step S22 of the sequence diagram shown in FIG. 4, the server transmits the generated XML data to the client.

In the structure of the present invention, the property information transmitted from the server to the client also includes information about the data scheme available from the server and the data scheme of the original content held by the server. The server generates XML data based on content-information including such information, and transmits the XML data to the client.

The server has various types of property information as content attribute information. Attribute information about content data is metadata, and an element of the metadata is property information. A portion of the property information is shown in FIGS. 6 and 7. The property information is presented to the client in response to a property information acquisition request based on the command [X_GETSchema] from the client.

FIGS. 6 and 7 are illustrations of a portion of the property information presented to the client. Property name (Property Name), data type (Type), such as a value or a character string, multiple (Multiple) indicating whether or not multiple properties can exist, and the particulars of the property (Property Description) are shown.

Total size (total Size) shown in FIG. 6 is data indicating the size of the original content. Container represents an object serving as a folder containing the content. Total duration (total Duration) indicates the total duration of the content. Recording quality level (record Quality Level) is data indicating the quality level or the degree of recording quality of the content, for example, having an integer value from 1 to 7, wherein 3=2 Mbps, 4=4 Mbps, 5=8 Mbps, etc.

A data section 301 shown in FIG. 6 represents the property information configured as information about the data scheme of the original content held by the server. Original file format (original File Format) indicates the format of the original unconverted content data. This property is represented by, for example, "MIME-Type," specifically, Audio/Mpeg, Audio/WAV, Audio/X-openmg, Audio/L16, Video/MPEG, Video/JPEG, etc. Original codec (Original Codec) indicates the codec, which is the encoded-data scheme, of the original unconverted content data.

Values that can be set as the property "Original Codec", i.e., allowed values, are preset, as shown in FIG. 8. There are various predetermined allowed values, e.g., MPEG1L3, ATRAC3, ATRAC3plus, . . . , JPEG, . . . , MPEG4V, etc., indicating various data compression schemes. The data compression schemes corresponding to these allowed values are shown in the description in FIG. 8.

The values set in the original codec (Original Codec) indicate encoded-data scheme information on the original content data held by the server, that is, encoded-data scheme information on original data that is not subjected to conversion by the data conversion function of the server.

Original resolution (original Resolution) indicates data resolution information on the original content held by the server. In this case, the content is image data. For example, various resolution information, including 1600×1200, 1280×1024, 800×600, etc., are set.

The server further has property information shown in FIG. 7 as content resource information. The server can provide information obtained by converting the original data using various schemes, as resource data separately from the original data, to the client. The data available to the client is resource data.

The content-associated property information also contains information about such resources. Resource protocol information (res@protocol Info) is information about the file format of the resources. The sign [res] indicates resource information. For example, like the original-content data-format information described above, the information about the file format of the resources is represented by "MIME-Type," specifically, Audio/Mpeg, Audio/WAV, Audio/X-openmg, Audio/L16, Video/MPEG, Video/JPEG, etc.

Resource codec (res@av:codec) indicates encoded-data scheme information on the resource data, and there are various predetermined allowed values indicating the data compression scheme shown in FIG. 8, such as MPEG1L3, ATRAC3, ATRAC3plus, . . . , JPEG, . . . , MPEG4V, etc. Resource size (res@size) indicates the size of the resource data.

The property information shown in FIGS. 6 and 7 is information held by the server as attribute information associated with the content, and indicates a portion of the information available to the client. Various types of content information other than those shown in FIGS. 6 and 7 are available from the server to the client in response to a property information acquisition request from the client.

It is possible for the client to receive and recognize the recording quality level, or the degree of data recording quality, of the content to be played back, and the details of codec information representing the coding scheme. It is further possible for the client device to select the optimum data scheme and to perform a transmission request. Thus, reception and playback of the optimum content data for the client can be achieved.

When the property information is transmitted from the server to the client, the client generates a display view (or user interface (UI)) allowing identification of the original data information based on the property information, and displays it on the display. Alternatively, the client identifies the optimum data scheme for the client device according to a pre-stored program, and transmits a content data transmission request in form of the identified data scheme to the server.

The client machine is configured to generate a display view (or user interface UI) allowing identification of data-scheme information available from the server and the original data information based on XML data constituted by the property information received from the server, and to display the display view on the display. This configuration allows the user to understand the data-scheme information available from the server and the original data information based on the information displayed on the display.

If the data scheme supported by the client device and the original data scheme held by the server match each other, the user selects the original data as transmission data from the server. Thus, high-quality data without excessive data conversion can be received and played back.

Referring back to FIG. 4, the processing sequence performed between the server and the client will still be described. In step S22, the server transmits to the client the XML data generated based on the above-described property information including the data-scheme information on the original content and the data-scheme information on the content available from the server. When the client receives the XML data, on the client machine side, a content information list is displayed on the display of the client machine based on the XML data.

Figure 9:
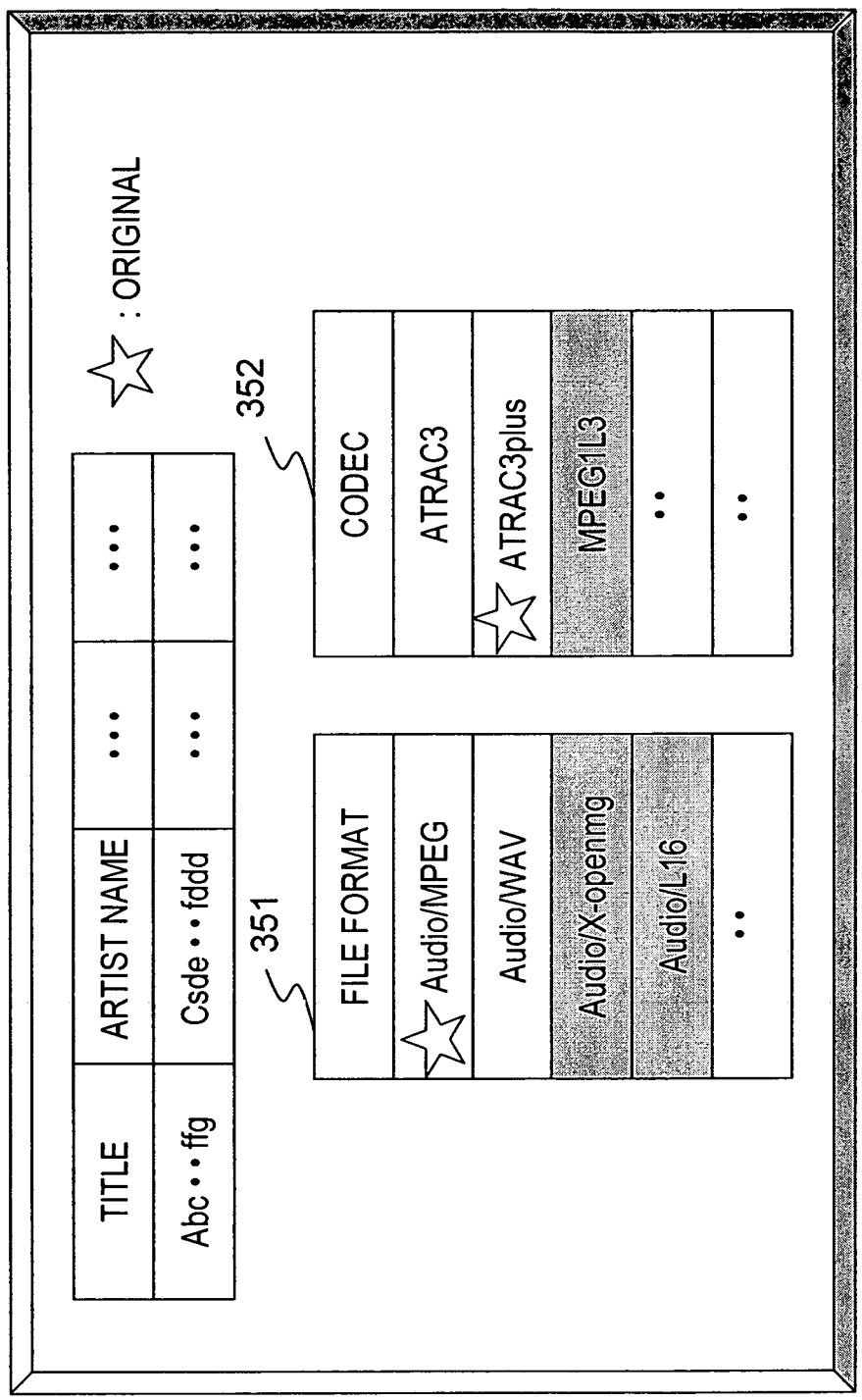
FIG. 9 is an illustration of display information presented to the client based on property information transmitted from the server to the client.
Figure 10:
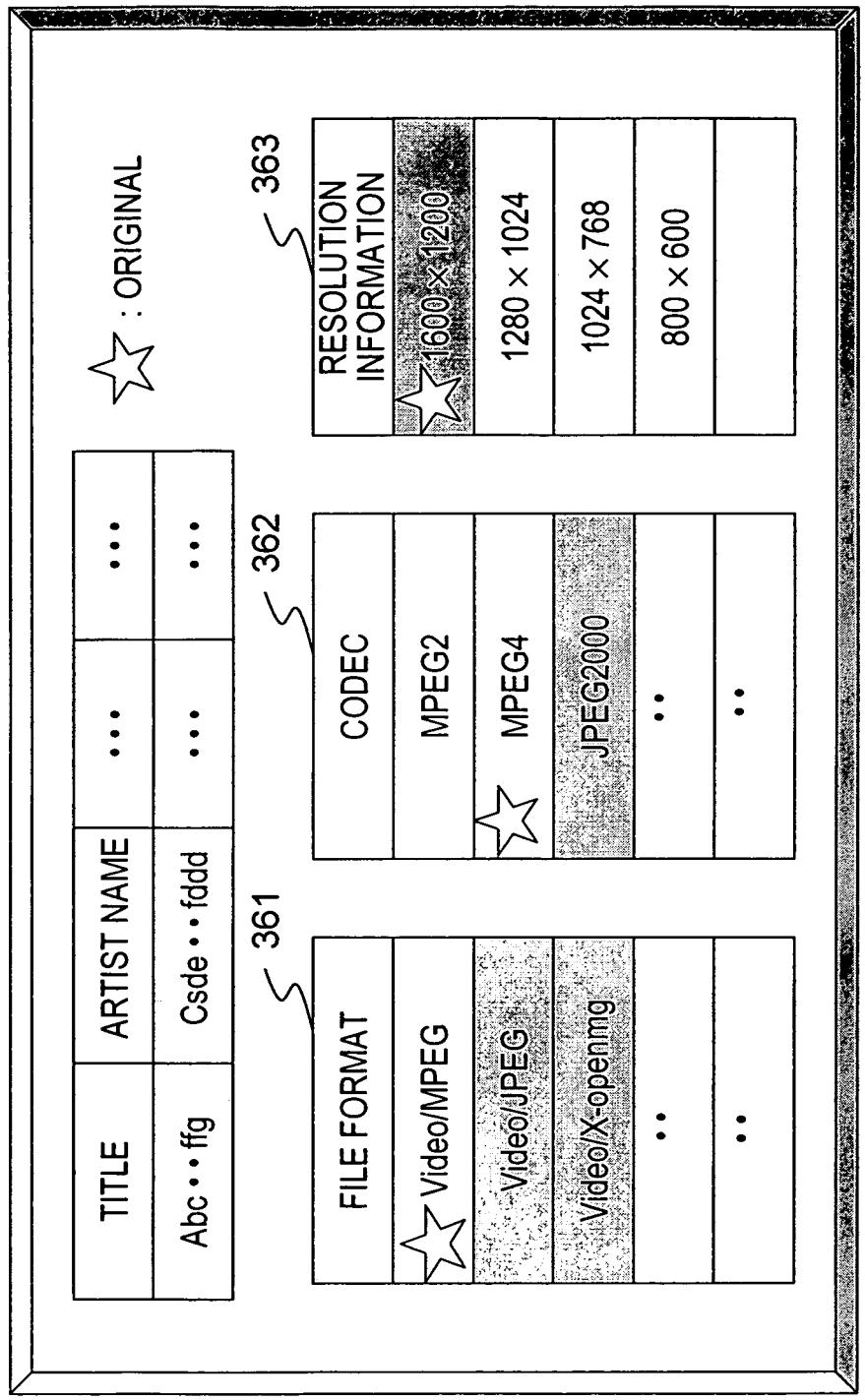
FIG. 10 is an illustration of display information presented to the client based on property information transmitted from the server to the client.

In this content information list display process, a list view is displayed based on the data-scheme information on the original content held by the server and the data-scheme information on the content available from the server to the client, described above. Content information list view examples are shown in FIGS. 9 and 10. FIG. 9 shows display information generated in the client device based on property information on audio data content, and FIG. 10 shows display information generated in the client device based on property information on image data content.

As shown in FIG. 9, the title, the artist name, etc., are displayed as basic content attribute information, and file format information 351 and codec information 352 corresponding to encoded-data scheme information are also displayed. In this example, the file format information and codec information on the original data held by the server are assigned star signs for identification. In the example shown in FIG. 9, furthermore, data schemes supported by the client device are indicated by white display areas, and unsupported data schemes are indicated by gray display areas. This example shows display processing performed based on the XML data received from the server and client's device processing function information.

The display information shown in FIG. 9 is generated according to a display processing program held in advance by the client device based on the XML data in accordance with the property information received from the server. The viewing manner is therefore different depending upon the setting of the display processing program. However, as described above, the property information received from the server includes the data-scheme information on the original content held by the server and the data-scheme information on the content available from the server to the client. The client generates display information allowing identification of these kinds of data-scheme information, and displays it on the display.

In the example shown in FIG. 9, it can be seen that the file format of the original data held by the server is Audio/MPEG, and the codec thereof is ATRAC3. If these original data schemes are supported by the client device, the user can specify the data schemes of the original data and can submit a content transmission request to the server. This processing allows the client to acquire high-quality content data that is not subjected to excessive data conversion by the server.

FIG. 10 shows exemplary display information when the content is image data. As shown in FIG. 10, the title, the artist name, etc., are displayed as basic content attribute information, and file format information 361, codec information 362 corresponding to encoded-data scheme information, and resolution information 363 are also displayed. In this example, the file format information, codec information, and resolution information on the original data held by the server are assigned star signs for identification. In the example shown in FIG. 10, furthermore, data schemes supported by the client device are indicated by white display areas, and unsupported data schemes are indicated by gray display areas. This example shows display processing performed based on the XML data received from the server and client's device processing function information.

In the example shown in FIG. 10, it is found that the file format of the original data held by the server is Video/MPEG, the codec thereof is MPEG4, and the resolution thereof is 1600×1200. If these original data schemes are supported by the client device, the user can specify these data schemes of the original data and can submit a content transmission request to the server. If this data is not supported, the user can select data having a format closer to the original and can perform a transmission request.

In the example shown in FIG. 10, the resolution of the original data held by the server is 1600×1200. However, as shown in FIG. 10, this resolution is displayed in gray on the client device, and therefore, is not supported by the display function of the client. Thus, data having a resolution of 1280× 1024, which is high-quality resolution data supported by the client device and closer to the resolution of the original data held by the server, is requested as transmission data. With respect to the file format and the codec, the data schemes of the original data held by the server are supported by the client. Thus, a content transmission request in which these data schemes, i.e., the data-scheme information below, are set is transmitted to the server:

File format: Video/MPEG
Codec: MPEG4
Resolution: 1280×1024

Referring back to FIG. 4, the processing sequence performed between the server and the client will be still be described. In step S23, the client displays the display information shown in FIG. 9 or 10 on the display of the client based on the XML data constituted by the property information received from the server. As described above, the display information is display information allowing identification of the data-scheme information on the original content held by the server and the data-scheme information on the content available from the server to the client, and is also display information allowing identification of whether or not each of the data-scheme information is supported by the client device.

In step S24, the user selects and determines a content data scheme to be requested to the server based on the display information. In step S25, the determined content data scheme information is transmitted from the client to the server. For example, the designation information described above, including the settings below, is transmitted:

File format: Video/MPEG
Codec: MPEG4
Resolution: 1280×1024

In step S26, the server extracts transmission content from the storage unit based on the information received from the client, and, if necessary, performs conversion in a data conversion unit in the server. In step S27, the server transmits the content to the client. In step S28, the client plays back the content received from the server.

As such, the client can receive, as content information held by the server, property information including data-scheme information on original content held by the server and data-scheme information on content available from the server to the client. The user can therefore select the original data by priority, or can select the optimum data for client's device function. Thus, high-quality data playback can be realized.

In the processing example described above, display information is generated based on the property information received from the server so that the display information includes data-scheme information on original content held by the server and data-scheme information on content available from the server to the client, and the user selects and determines the data scheme of the transmission data. However, without performing data scheme selection by the user, a processing program of the client device may be configured to compare the property information received from the server with the client device processing function information, to automatically select data having a data scheme that is supported by the client and that is the closest to the data scheme of the original data held by the server according to predetermined setting information, and to automatically transmit to the server a content transmission request in which the selected data-scheme information is specified as the data scheme of the transmission data.

The procedure of a process for acquiring property information, a process for generating and displaying display information based on the property information, and a process for determining a data scheme of transmission content and receiving the content, which is performed by the client device, will be described with reference to a processing flow-chart shown in FIG. 11.

In step S111, the client device submits a property information acquisition request to the server. As described above, this processing is performed by, for example, transmitting command [X_GETSchema] with a class being specified to the server.

In step S112, the client receives property information from the server as XML data. In step S113, the client generates display information (UI) based on the received property information, and displays the display information on the display. As described above with reference to FIGS. 9 and 10, this information is display information allowing identification of the data-scheme information on the original content held by the server and the data-scheme information on the content available from the server to the client, and is also display information allowing identification of whether or not each of the data-scheme information is supported by the client device.

In step S114, the user determines a data scheme including the file format, the codec, and the resolution information based on the content information displayed on the display of the client device. In step S115, the user transmits the determined data-scheme information to the server. The server selects data based on the data-scheme information received from the client, and transmits content data having a data scheme specified by the client by performing data conversion, if necessary, to the client. In step S116, the client receives the content from the server, and performs playback processing. The playback processing performed by the client may include data conversion by a data conversion processing unit, such as a codec, in the client.

Figure 11:
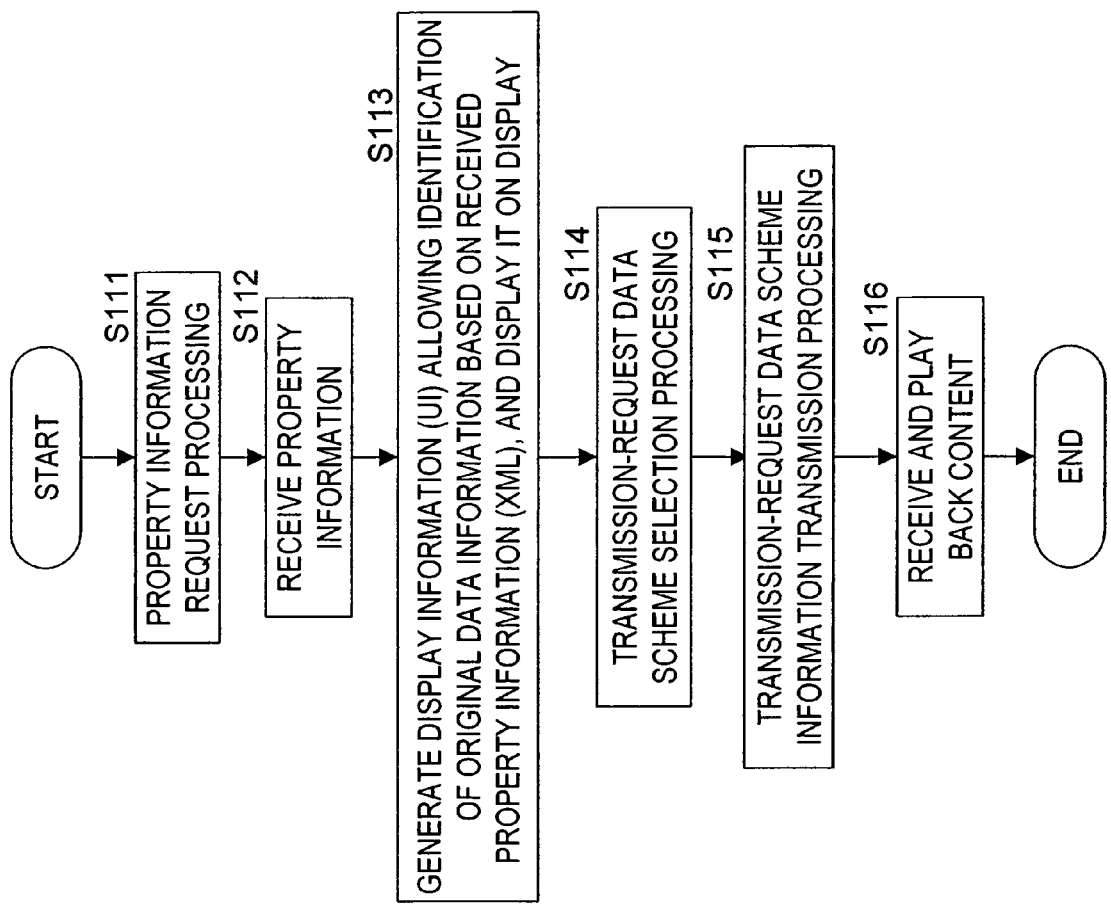
FIG. 11 is a flowchart showing a processing procedure for determination of a transmission data scheme, content request, and reception based on property information transmitted from the server to the client.
Figure 12:
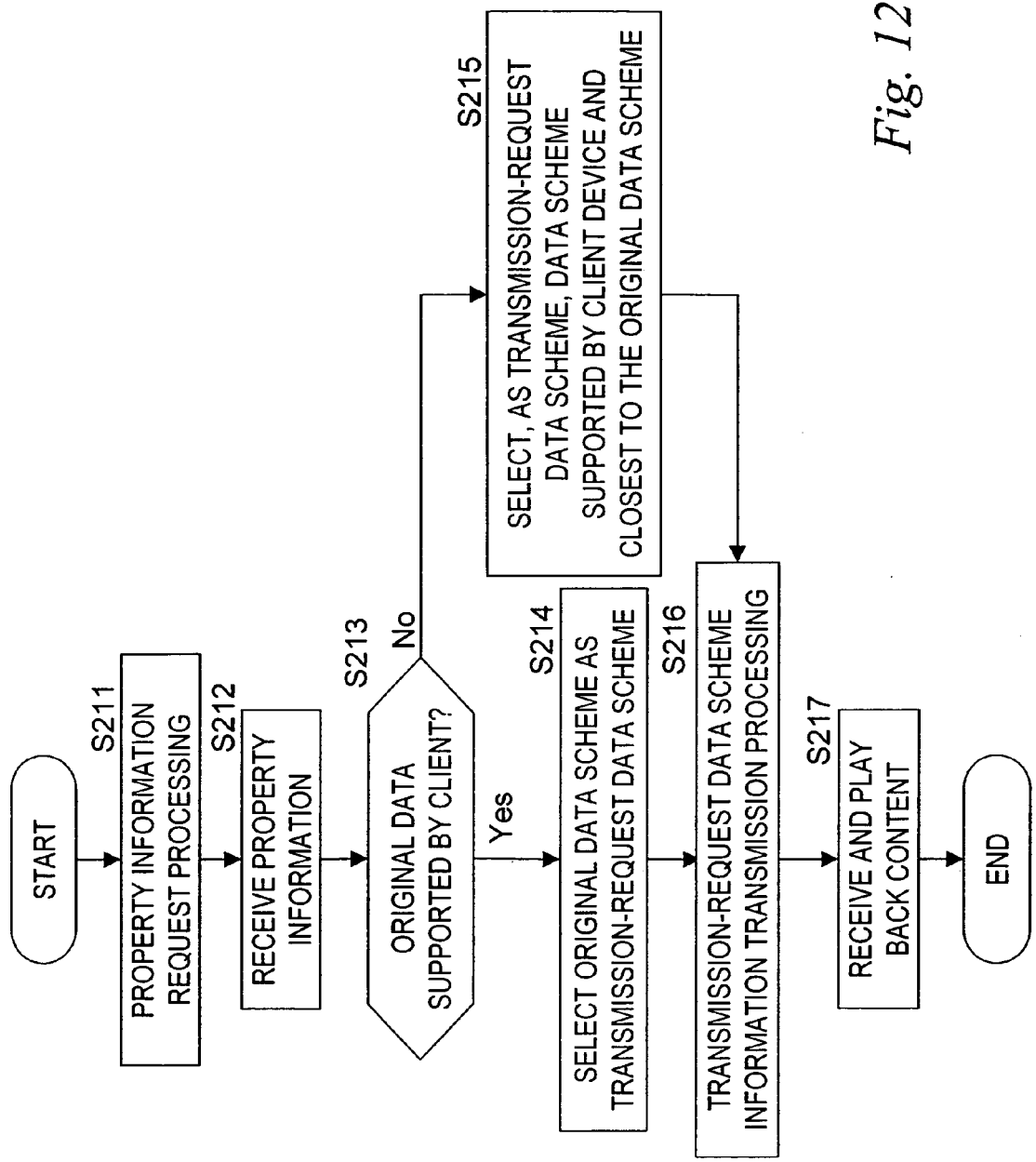
FIG. 12 is a flowchart showing a processing procedure for determination of a transmission data scheme, content request, and reception based on property information transmitted from the server to the client.

The processing example shown in FIG. 11 is a processing example in which display information is generated based on the property information received from the server and the user selects a data scheme based on the display information. Next, a processing procedure in which the client device automatically selects a data scheme without the intervention of selection by the user will be described with reference to FIG. 12.

In step S211, the client device submits a property information acquisition request to the server. As described above, this processing is performed by, for example, transmitting command [X_GETSchema] with a class specified to the server.

In step S212, the client receives property information from the server as XML data. In step S213, the data scheme of the original data held by the server, which is included in the property information received from the server, is compared with client device processing function information to determine whether or not the data scheme of the original data held by the server is supported by the client device.

If Yes is determined in step S213, or if the data scheme of the original data held by the server is supported by the client device, the process proceeds to step S214, and the data scheme of the original data held by the server is determined as a data scheme of transmission content.

On the other hand, if No is determined in step S213, or if the data scheme of the original data held by the server is not supported by the client device, in step S215, data having a data scheme that is supported by the client and that is closest to the data scheme of the original data held by the server is automatically selected according to predetermined setting information. The setting information is configured as, for example, table information in which one data scheme to be transmitted and requested is set based on a combination of three pieces of data-scheme information, i.e., the data-scheme information on the original content, the data-scheme information available from the server, and the data-scheme information supported by the client device.

In step S216, the determined data-scheme information is transmitted to the server. The server selects data based on the data-scheme information received from the client, and transmits content data having a data scheme specified by the client by performing data conversion, if necessary, to the client. In step S217, the client receives the content from the server, and performs playback processing.

As described above, in the structure of the present invention, property information as an element of metadata corresponding to content attribute information includes data-scheme information on original content held by the server and data-scheme information on content available from the server to the client, specifically, file format information, codec information, and resolution information, and these pieces of information are transmitted from the server to the client in response to a property information acquisition request from the client. Thus, the client can determine the optimum data scheme based on the data-scheme information on the original content held by the server and the data-scheme information on the content available from the server to the client, and can output a content transmission request to the server. Therefore, acquisition and playback of high-quality data, i.e., the original data without excessive data conversion or high-quality data close to the original data, can be achieved by the client.

[Functional Configuration of Server and Client]

The hardware configuration of the server and the client device has been previously described with reference to FIG. 2. The various processes described above are executed by a CPU serving as a controller according to a program stored in a storage unit of each of the server and the client.

The processing executed by the CPUs includes, for example, on the server side, a process for obtaining content-associated metadata in response to a request from the client and generating XML data based on property information, and a process for acquiring a data scheme requested by the client, such as file format information, codec information, and resolution information, extracting content data according to the acquired information, and performing data conversion, if necessary, and a process for transmitting the content to the client.

The processing on the client side includes a process for displaying a content information list on the display based on the XML data constituted by the property information received from the server, a process for determining a content data scheme to be requested to the server based on client's device function and the content information, and a process for controlling playback of the received content.

These processes are basically performed under control of the CPUs serving as controllers of the server and the client device. The functional configuration of the server and the functional configuration of the client necessary for executing the processes described above will be described with reference to FIGS. 13 and 14.

Figure 13:
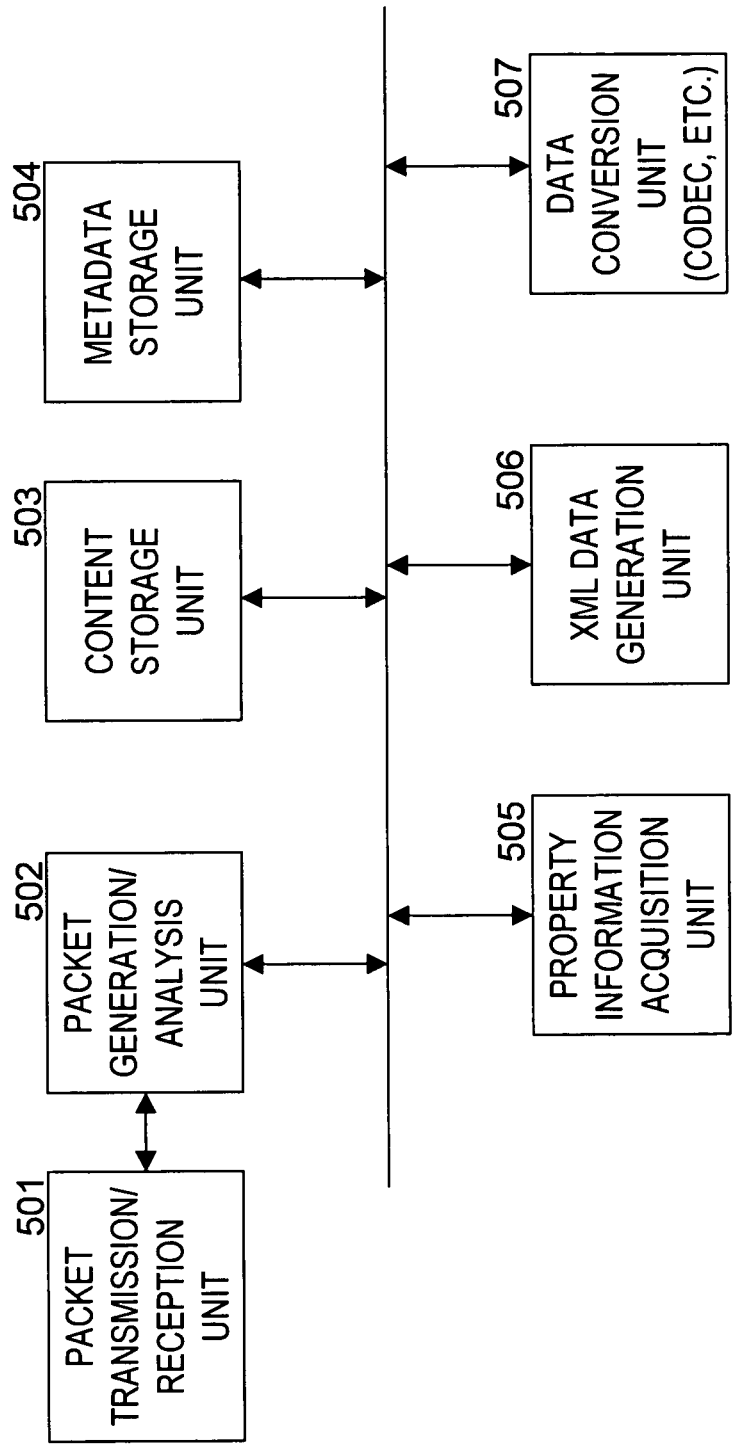
FIG. 13 is a block diagram showing processing functions of the server.

FIG. 13 is a block diagram showing the main functional configuration of the server. A packet transmission and reception unit 501 receives a packet to the client and a packet from the client. A packet generation and analysis unit 502 performs transmission packet generation processing and received-packet analysis processing, including address setting of each packet, address identification, data storage to the data section, and data acquisition processing from the data section.

A content storage unit 503 stores content held by the server. The content includes original content and content data in which the original content is converted into data. A metadata storage unit 504 is a storage unit storing metadata indicating attribute information associated with the content.

As described above, the metadata storage unit 504 stores property information constituting the metadata, and the property information includes data-scheme information on original content held by the server and data-scheme information on content available from the server to the client, specifically, file format information, codec information, and resolution information, as described with reference to FIGS. 6 and 7.

A property information acquisition unit 505 performs a process for retrieving metadata corresponding to a specified class from the metadata storage unit 504 according to a property information acquisition request received from the client, e.g., a packet having command [X_GETSchema] with a class name.

An XML data generation unit 506 generates XML data to be transmitted to the client based on the metadata acquired by the property information acquisition unit 505. A data conversion unit 507 converts the original content held by the server into the data scheme requested by the client. That is, the file format, the codec, the resolution, etc., are converted. For example, data conversion based on ATRAC3 and MPEG4 is performed. Servers have different codec functions, and therefore have different resource data available to the client depending upon their functions.

Next, the functional configuration of the client device will be described with reference to FIG. 14. A packet transmission and reception unit 601 receives a packet to the server and a packet from the server. A packet generation and analysis unit 602 performs transmission packet generation processing and received-packet analysis processing, including not only analysis on the data stored in each packet but also address setting of each packet, address identification, data storage to the data section, and data acquisition processing from the data section.

A storage unit 603 stores content included in the packet received from the server, client codec information, etc.

An output unit 604 includes a speaker and a display used for playing back the content. The display is also used for outputting the display information described above with reference to FIGS. 9 and 10. An input unit 605 includes, for example, a keyboard and other data inputting means for inputting information about the selected content data scheme displayed as the display information.

An XML data analysis unit 606 analyzes the XML data constituted by the property information received from the server, generates the display information described above with reference to FIGS. 9 and 10 based on the analyzed data, and outputs the display information to the display serving as the output unit.

A received-data-scheme determination unit 607 determines the optimum data scheme to be received from the server, specifically, file format information, codec information, and resolution information, based on the property information received from the server, i.e., the data-scheme information on the original content held by the server and the data-scheme information on the content available from the server to the client, and client-device processing function information.

A data conversion unit 608 performs data scheme conversion processing on the content data received from the server. For example, data decoding based on ATRAC3 and MPEG4 is performed. The decoded data may be re-encoded, and the re-encoded data may be stored in the storage unit 603.

Figure 14:
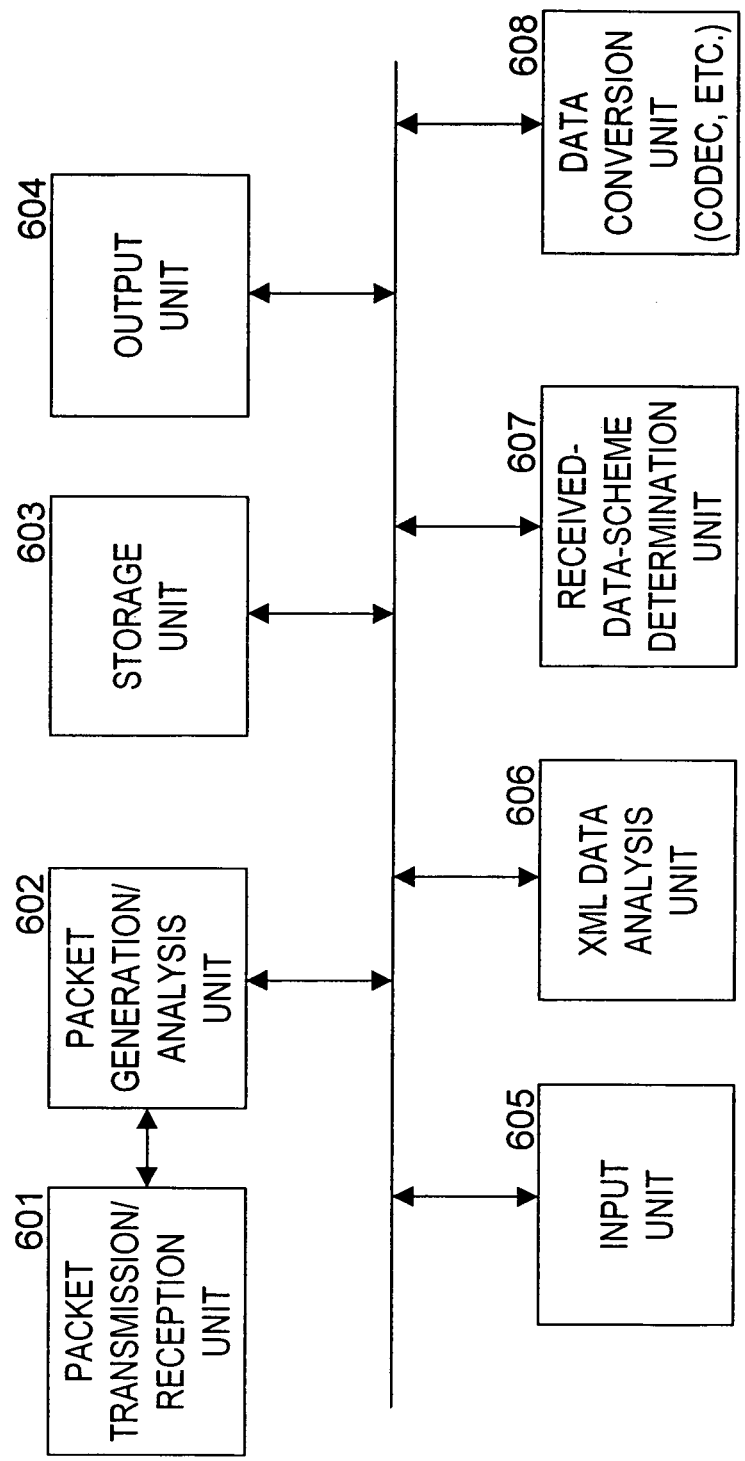
FIG. 14 is a block diagram showing processing functions of the client.

Functionally, the server and the client have the functions described in FIGS. 13 and 14, and perform the processes described above. However, the block diagrams shown in FIGS. 13 and 14 are block diagrams describing the functions, and, actually, various processing programs are executed under control of the CPUs in the hardware configuration of the PC shown in FIG. 2 or the like.

The present invention has been described in detail with reference to a specific embodiment. However, it is obvious that modifications and alternatives of the embodiment may be made by a person skilled in the art without departing from the scope of the present invention. That is, the present invention has been disclosed in view of an example, and should not be restrictively construed. Reference should be made to the appended claims for delineation of the scope of the present invention.

The series of processes described in this document may be executed by hardware, software, or a combination thereof. When the processes are executed by software, a program recording the sequence of processes may be installed into a memory of a computer incorporated in dedicated hardware and may be executed, or the program may be installed into a general-purpose computer capable of executing various processes and may be executed.

For example, the program may be recorded in advance in a recording medium, such as a hard disk or a ROM (Read Only Memory). Alternatively, the program may be temporarily or persistently stored (recorded) in a removable recording medium, such as a flexible disk, a CD-ROM (Compact Disc Read Only Memory), an MO (Magneto optical) disk, a DVD (Digital Versatile Disc), a magnetic disk, or a semiconductor memory. The removable recording medium may be offered as so-called packaged software.

The program may be installed from the removable recording medium described above to a computer, or may be wirelessly transferred from a download site to the computer or transferred to the computer via lines over a network, such as a LAN (Local Area Network) or the Internet. The computer may receive the thus transferred program and may install it into a recording medium, such as a built-in hard disk.

The processes described in this document may be executed in a time-series manner according to the description, or may be executed in parallel or individually depending upon the processing performance of an apparatus executing the processes or according to the necessity. The system in this document is a logical set of a plurality of apparatuses and is not limited to the structure in which these apparatuses are housed in a single housing.

INDUSTRIAL APPLICABILITY

According to the structure of the present invention, therefore, in a content providing server, data-scheme information on original content held by the server, specifically, file format information, codec information representing an encoded-data scheme, and resolution information, is stored in property information constituting meta-information that is content-associated attribute information. Upon reception of a content information acquisition request from a client, content information including the data-scheme information on the original content held by the server is generated, and the content information is transmitted to the client. Thus, the client can determine the optimum data scheme based on the data-scheme information on the original content held by the server, and can perform a content transmission request in which the data scheme is specified. Therefore, acquisition and playback of high-quality data, that is, the original data without excessive data conversion or high-quality data close to the original data, can be achieved by the client.

According to the structure of the present invention, furthermore, a client device submitting a content transmission request to a content providing server generates display information configured to allow identification of data-schemer information on original content held by the server, which is contained in property information that is an element of the content information received from the server, and displays the display information on a display of the client. The user can therefore identify the data-scheme information on the original content and data-scheme information on content available from the server to the client based on the display information, and can easily determine the optimum data scheme before outputting a content transmission request to the server.

According to the structure of the present invention, furthermore, a client device submitting a content transmission request to a content providing server determines a transmission data scheme from the server based on data-scheme information on original content held by the server, which is contained in property information that is an element of content information received from the server, data-scheme information on content available from the server to the client, and client-device processing function information, and outputs a content transmission request with the determined information to the server. Thus, acquisition and playback of the original data without excessive data conversion or high-quality data close to the original data can be achieved without placing a processing load for data selection, etc., on the user.

The invention claimed is:

1. A content providing server apparatus comprising: processing circuitry configured to:
receive a content request from a content requesting client apparatus;
determine a set of available data schemes for a content requested by the content request, which includes determining an original data scheme of the content and a set of other available data schemes of the content and wherein the original data scheme of the content and the set of other available schemes of the content include at least file format information;
generate content information indicating which of the set of available data schemes is the original data scheme, based on the determination;
convert the requested content into one or more of the other available content schemes;
transmit the content information including the indication of which of the set of available data schemes is the original data scheme to the content requesting client;
transmit, separately from the original data scheme, resource data obtained from the content information; and transmit the requested content to the content requesting client based on a selection of one of the set of available data schemes, which includes transmitting the requested content converted into the one or more of the other available content schemes when the one or more of the other available content schemes is selected.

2. The content providing server apparatus according to claim 1, wherein the content information is included in an XML (eXtensible Markup Language) file.

3. A content providing method comprising:

receiving, by a receiver, a content request for content from a content requesting client apparatus;

extracting an original data scheme of original content corresponding to the requested content from a storage unit in a content providing server apparatus;

determining a set of available data schemes for the content requested by the content request, which includes the original data scheme and a set of other available data schemes of the content and wherein the original data scheme of the content and the set of other available schemes of the content include at least file format information;

generating content information, the content information indicating which of the set of available data schemes is the original data scheme, based on the determination;

converting the requested content into one or more of the other available content schemes;

transmitting the content information including the indication of which of the set of available data schemes is the original data scheme to the content requesting client apparatus;

transmitting, separately from the original data scheme, resource data obtained from the content information; and transmitting, by a transmitter, the content information to the content requesting client apparatus based on a selection of one of the set of available data schemes received from the content requesting client apparatus, which includes transmitting the requested content converted into the one or more of the other available content schemes when the one or more of the other available content schemes is selected.

4. The content providing method according to claim 3, wherein the content information is included in an XML (eXtensible Markup Language) file.

5. A non-transitory storage medium having a computer program for causing a computer to perform a content providing method, the method comprising:

receiving, by a receiver, a content request for content from a content requesting client apparatus;

extracting an original data scheme of original content corresponding to the requested content from a storage unit in a content providing server apparatus;

determining a set of available data schemes for the content requested by the content request, which includes the original data scheme and a set of other available data schemes of the content and wherein the original data scheme of the content and the set of other available schemes of the content include at least file format information;

generating content information, the content information indicating which of the set of available data schemes is the original data scheme, based on the determination;

converting the requested content into one or more of the other available content schemes;

transmitting the content information including the indication of which of the set of available data schemes is the original data scheme to the content requesting client apparatus;

transmitting, separately from the original data scheme, resource data obtained from the content information; and transmitting, by a transmitter, the content information to the content requesting client apparatus based on a selection of one of the set of available data schemes received from the content requesting client apparatus, which includes transmitting the requested content converted into the one or more of the other available content schemes when the one or more of the other available content schemes is selected.

* * * * *